(12) United States Patent
Ikeda et al.

(10) Patent No.: US 8,106,991 B2
(45) Date of Patent: Jan. 31, 2012

(54) IMAGE PROCESSING APPARATUS AND IMAGE PROCESSING METHOD

(75) Inventors: Tetsuo Ikeda, Tokyo (JP); Ken Miyashita, Tokyo (JP); Tatsushi Nashida, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 384 days.

(21) Appl. No.: 12/490,660

(22) Filed: Jun. 24, 2009

(65) Prior Publication Data
US 2009/0322926 A1 Dec. 31, 2009

(30) Foreign Application Priority Data
Jun. 25, 2008 (JP) ................................ P2008-165605

(51) Int. Cl.
*H04N 5/222* (2006.01)
*H04N 5/228* (2006.01)
(52) U.S. Cl. ................................ 348/333.12; 348/222.1
(58) Field of Classification Search .............. 348/333.12
See application file for complete search history.

(56) References Cited

U.S. PATENT DOCUMENTS

| 4,949,180 | A | 8/1990 | Miles | |
| 6,920,619 | B1 | 7/2005 | Milekic | |
| 7,355,620 | B2 * | 4/2008 | Ikehata et al. | 348/14.03 |
| 7,659,923 | B1 * | 2/2010 | Johnson | 348/218.1 |
| 2004/0223649 | A1 | 11/2004 | Zacks et al. | |
| 2005/0024516 | A1 | 2/2005 | Fish et al. | |
| 2008/0239133 | A1 * | 10/2008 | Cazier et al. | 348/333.05 |
| 2009/0204890 | A1 * | 8/2009 | Matsutani et al. | 715/246 |
| 2010/0066840 | A1 * | 3/2010 | Asukai et al. | 348/207.1 |

FOREIGN PATENT DOCUMENTS

| JP | 2000-41170 | 2/2000 |
| WO | WO 2006/054207 A1 | 5/2006 |

OTHER PUBLICATIONS

European Search Report dated Sep. 21, 2009, in corresponding European Application No. 09 25 1251.
Aseem Agarwala et al. "Interactive Digital Photomontage," ACM Transactions on Graphics, ACM, US, vol. 3, No. 23, XP-002359799, pp. 294-302 (Aug. 1, 2004).

* cited by examiner

*Primary Examiner* — Albert Cutler
(74) *Attorney, Agent, or Firm* — Finnegan, Henderson, Farabow, Garrett & Dunner, L.L.P.

(57) ABSTRACT

There is provided an image processing apparatus including: a display screen displaying a first image included in a continuously taken image group, a friction position detector detecting a friction position on the display screen rubbed by a user, and an image synthesizing unit synthesizing a pixel area of the first image corresponding to the friction position, and a pixel area of a second image included in the image group, wherein the image synthesizing unit switches the second image to be synthesized with the first image so as to increase an imaging time difference between the first image and the second image along with an increase in the amount of friction rubbed by the user.

7 Claims, 17 Drawing Sheets

FIG.6

BRUSH MATRIX

| | | 0.6 | | |
|---|---|---|---|---|
| | 0.6 | 0.8 | 0.6 | |
| 0.6 | 0.8 | 1.0 | 0.8 | 0.6 |
| | 0.6 | 0.8 | 0.6 | |
| | | 0.6 | | |

FIG.8

MATRIX

RUBBED AREA

| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
|---|---|---|---|---|---|---|---|---|---|---|---|---|---|---|---|
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.6 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.6 | 10.8 | 10.6 | 10.0 | 10.0 | 10.0 | 10.0 | 10.0 | 10.0 | 10.0 | 10.0 | 10.0 | 10.0 |
| 10.0 | 10.0 | 10.6 | 10.8 | 11.0 | 10.8 | 10.6 | 10.0 | 10.0 | 10.0 | 10.0 | 10.0 | 10.0 | 10.0 | 10.0 | 10.0 |
| 10.0 | 10.0 | 10.0 | 10.6 | 10.8 | 10.6 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.6 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |

FIG.9

CONVERSION TABLE

| MATRIX VALUE | DISPLAYING IMAGE |
|---|---|
| 0.0 ~ 10.0 | IMAGE 1 |
| 10.0 ~ 20.0 | IMAGE 1, IMAGE 2 |
| 20.0 ~ 30.0 | IMAGE 2 |
| 30.0 ~ 40.0 | IMAGE 2, IMAGE 3 |
| ⋮ | ⋮ |

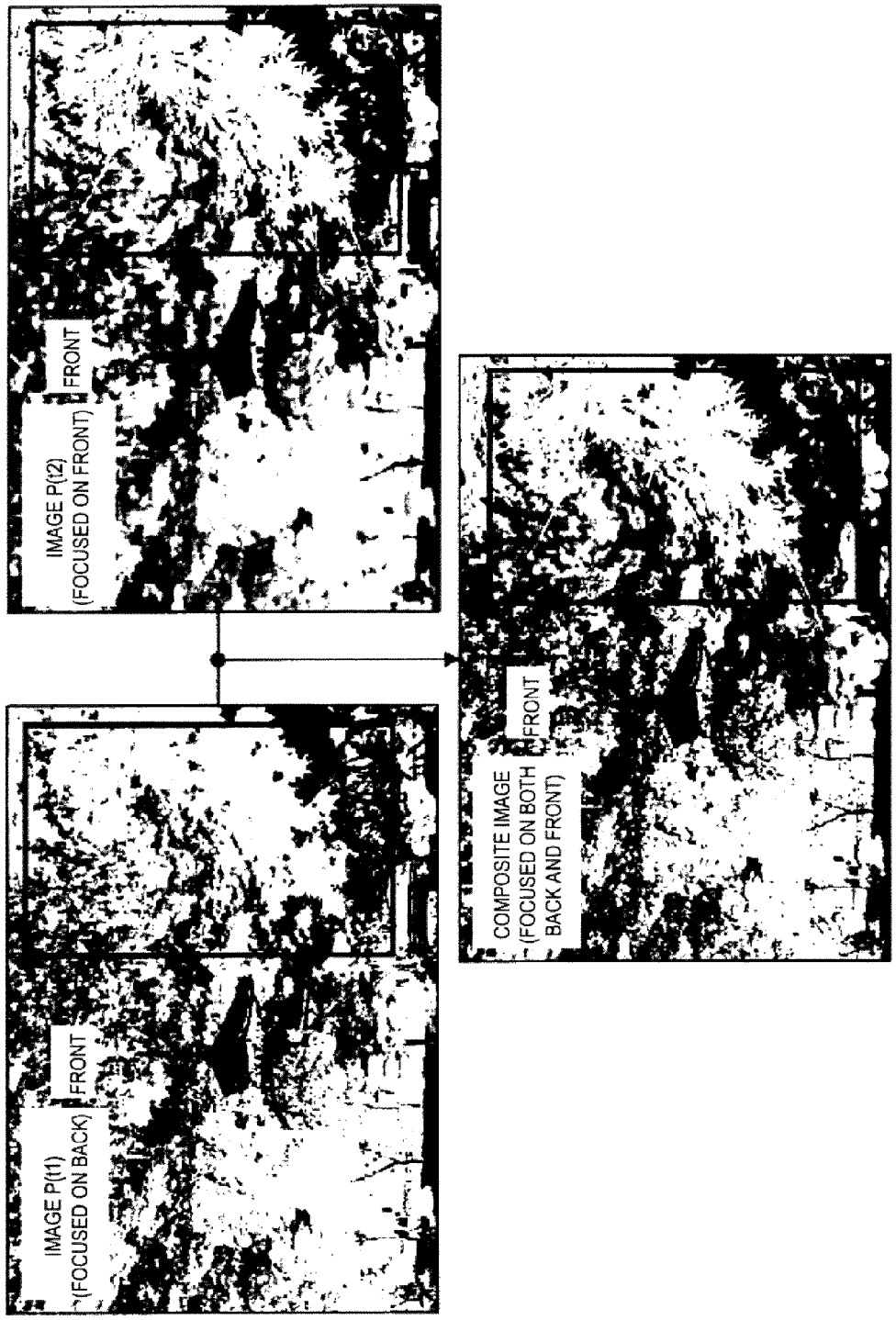

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

In recent years, imaging devices equipped with a continuous imaging function for continuously taking a plurality of images are becoming widespread. In addition, the plurality of images taken using the continuous imaging function are synthesized into one image, and accordingly, a technique for forming an image with a higher image quality than the image before synthesization has been developed. Such synthesization processing of images is automatically executed in the imaging device or executed on a personal computer (hereinafter, referred to as PC) by transferring image data to the PC. For example, Japanese Patent Application Laid-Open No. 2000-41170 discloses a technique for synthesizing a plurality of images are automatically with an imaging device, and displaying synthesization image thereof displayed as one still image.

The synthesization of images, for example, is used for forming a panoramic image by synthesizing images having different imaging ranges. In addition, a technique is known in which a plurality of images taken while moving by the amount of movement no more than a pixel size that an image sensor has are synthesized, and accordingly, an image with higher resolution than resolution of the image sensor is formed. Incidentally, there is also a case where although continuously taken images are not synthesized, for example, continuous imaging is performed to help a photographer select an image conforming to his/her intention from a plurality of continuously taken images. Specifically, continuous imaging may be used in order to avoid an image in which a person blinks at a time of imaging, or an unintended object is included in an imaging range.

SUMMARY OF THE INVENTION

However, when many persons are included in an imaging target for object like a group image, it is difficult to take an image in which no one blinks even when performing continuous imaging. Therefore, even when continuous imaging is performed, there are cases where the intended image of a photographer is not included in a plurality of images taken. In such a case, the photographer is unable to obtain an image conforming to his/her intention. In addition, a high degree of operational skills and knowledge are desired to correct or synthesize an image, and the like using an image processing application by transferring image data to a PC or the like. Therefore, a image correcting or synthesizing process, and the like causes a large burden on the photographer. As a result, the photographer frequently gives up trying to obtain his/her intended image, and just selects an image that is relatively close the intended image.

Consequently, the present invention has been made in view of the above issues, and it is desirable to provide a novel and improved image processing apparatus and image processing method, which are capable of partially synthesizing a plurality of series of images by a simple operation, in order to obtain the intended image of the photographer.

In order to solve the above issue, according to an embodiment of the present invention, there is provided an image processing apparatus including: a display screen displaying a first image included in a continuously taken image group; a friction position detector detecting a friction position on the display screen rubbed by a user; and an image synthesizing unit synthesizing a pixel area of the first image corresponding to the friction position, and a pixel area of a second image included in the image group; wherein the image synthesizing unit switches the second image to be synthesized with the first image so as to increase an imaging time difference between the first image and the second image along with an increase in the amount of friction rubbed by the user.

The image synthesizing unit may increase a synthesization ratio of the second image to the first image along with the increase in the amount of friction, and switches the second image to an image in which imaging time difference from the first image is larger at a stage where the amount of friction exceeds a predetermined threshold.

The image synthesizing unit may display the second image before switching to the pixel area till the amount of friction exceeds the predetermined threshold by a predetermined amount, and switches the second image at a stage where the predetermined amount is exceeded.

The amount of friction may be one amount selected from the number of times in which the pixel area is rubbed, pressing force at the time of friction, a direction of friction, and a friction velocity; or the amount determined by a plurality of combinations.

The image group may be a plurality of continuously taken images while changing an arbitrary parameter that is modifiable at the time of imaging.

The parameter may be a depth of field, an image effect, or a control parameter which is for controlling flash.

In addition, in order to address the above issue, according to another embodiment of the present invention, there is provided an image processing method including the steps of: detecting a position of friction on a display screen rubbed by a user when a first image included in a continuously taken image group is displayed on the display screen; and synthesizing images of a pixel area of the first image corresponding to the position of friction and a pixel area of a second image included in the image group; wherein in the step of synthesizing images, the second image to be synthesized with the first image is switched so as to increase an imaging time difference between the first image and the second image with an increase in the amount of friction applied by the user.

According to the embodiments of the present invention described above, it becomes possible to partially synthesize a plurality of continuously taken images by a simple operation. As a result, it becomes possible for a photographer to obtain an intended image by partially synthesizing a plurality of images.

BRIEF DESCRIPTION OF THE DRAWINGS

FIG. 6 is an explanation view showing one example of a brush matrix according to the present embodiment;

FIG. 8 is one example of a depth matrix according to the present embodiment;

FIG. 9 is an explanation view showing one example of a conversion table according to the present embodiment;

FIG. 13 is an explanation view showing one application example of an image processing technique according to the present embodiment;

DETAILED DESCRIPTION OF THE PREFERRED EMBODIMENTS

Figure 1:
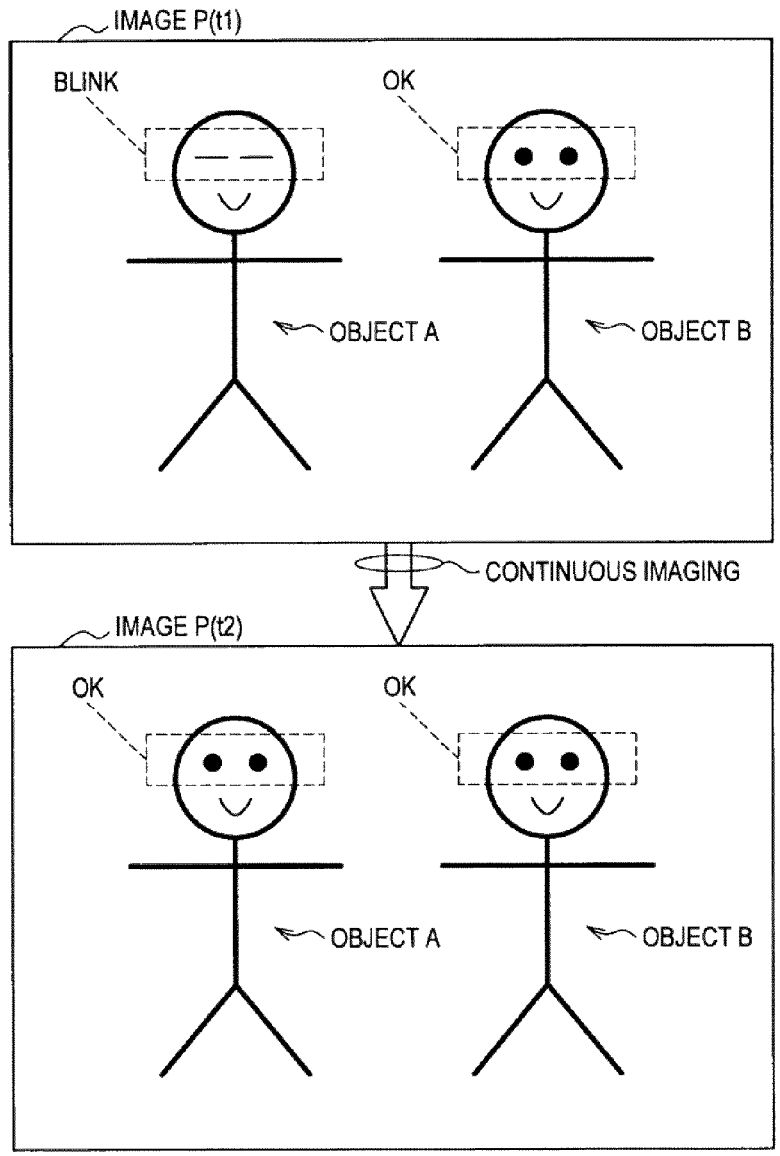
FIG. 1 is an explanation view showing one example of continuously taken object images.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Now, a flow of the description to be explained hereinafter will be described briefly. First, an aim of the technology according to an embodiment of the present invention will be simply described with reference to FIGS. 1 and 2. In the description, a specific issue to be addressed by the technology according to the embodiment will be described. After that, the principles same involved in the technology according to the embodiment will be described with reference to FIG. 3. Subsequently, a functional configuration of an image processing apparatus 100 capable of achieving the above technique will be described with reference to FIGS. 4 to 9.

Next, the operation of the image processing apparatus 100 will be described with reference to FIG. 10. Further, a flow of a depth calculation process to be carried out by the image processing apparatus 100 will be described with reference to FIG. 11. Then, one example of an application regarding technology according to the embodiment will be described with reference to FIGS. 12A to 12C. Further, another example of an application according to the embodiment will be described with reference to FIG. 13. Last, a hardware configuration example of the image processing apparatus 100 and an imaging device 200 according to the embodiment will be described with reference to FIGS. 14, and 15.

Figure 2:
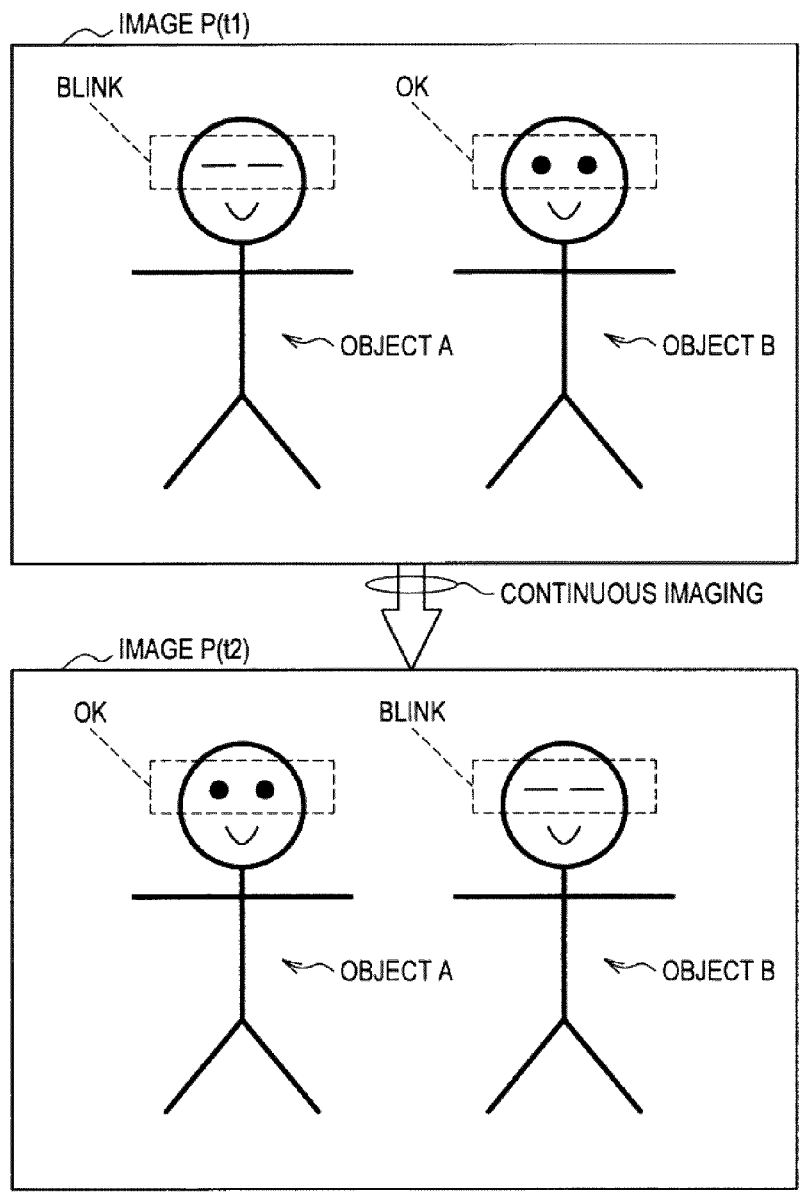
FIG. 2 is an explanation view showing one example of continuously taken object images.

First, an aim of the technique according to the embodiment to be described later will be simply described with reference to FIGS. 1 and 2. FIGS. 1 and 2 are explanation views, each showing one schematic example of continuously taken object images. In the following description, an example shown in FIG. 1 is referred to as a case 1; and an example shown in FIG. 2 is referred to as a case 2.

First, FIG. 1 will be referred to. In FIG. 1, an image P(t1) taken at a time t1 and an image P(t2) taken at a time t2 are depicted. In this regard, however, the times t1 and t2 are continuing imaging times. In addition, in the images P(t1) and P(t2), two object images (an object A and an object B) are included, respectively. In this case, a "blink" of imaging object A is noted.

In case 1, the object A included in the image P(t1) is one taken at the moment of blinking moment. Therefore, the object A included in the image P(t1) is not in a state that conforms to a photographer's intention. Whereas, the object B included in the image P(t1) is not blinking and is a state conforming to the photographer's intention (OK).

As described above, the image P(t1) which includes the object image unintended is not conforming to the photographer's intention. On the other hand, the object A and the object B included in the image P(t2) are not blinking and thus are states conforming with the photographer's intention (OK). Therefore, the image P(t2) is an image conforming to the photographer's intention. In the case where the image (image P(t2)) conforming to the photographer's intention is included in a plurality of continuously taken images as shown in the case 1, the photographer may select the image P(t2) conforming with his/her intention.

Next, FIG. 2 will be referred to. Similarly to FIG. 1, an image P(t1) taken at a time t1 and an image P(t2) taken at a time t2 are depicted in FIG. 2. Also, in case 2, the times t1 and t2 are continuing imaging times. In addition, two object images (an object A and an object B) are included in the images P(t1) and P(t2), respectively.

Also, in the case of the case 2, the object A included in the image P(t1) is one taken at a blinked moment. Therefore, the object A included in the image P(t1) is not a state conforming to a photographer's intention. In this regard, however, the object B included in the image P(t1) has no blink and is a state conforming to the photographer's intention (OK). That is, the image P(t1) which includes the object image not conforming to the photographer's intention is not an image conforming to the photographer's intention.

On the other hand, the object A included in the image P(t2) has no blink and is a state conforming to a photographer's intention (OK). In this regard, however, the object B included in the image P(t2) is one taken at a blinked moment. Therefore, the image P(t2) is not an image conforming to the photographer's intention. In the case where the image (image P(t2)) conforming to the photographer's intention is included in a plurality of continuously taken images as shown in the case 1, the photographer may select the image P(t2) conforming to his/her intention. However, in case 2, there no image can be selected.

As shown in the case 1, when an image conforming to the photographer's intention exists in the continuously taken images such as frame advance by releasing the shutter plural times in a short time, it is possible to apply a method which picks up the image conforming to the intention thereof. However, as shown in case 2, the photographer's intended object image is not included in the continuously taken images, it is not possible to apply the technique for selecting an image conforming to the intention. For example, in the case where many person's images are included in an imaging range like a group image, it is difficult to capture a moment at which no one is blinking, and therefore, there is high probability of being in a the state like that of case 2.

In view of such an actual state, the image conforming to the photographer's intention can be obtained by a technology according to an embodiment to be described hereinafter, even with regard case 2. However, the technique according to the embodiment can be applied not only as a countermeasure against the blinking of the object, but also applied to a wide variety of cases as shown in the example applications described below. In addition, an application range of the technology according to the embodiment is not limited to an image. For example, moving picture image frames and various still images, constituting broadcasting data and video data, are also included in the application range. However, hereinafter, for the sake of convenience, it will be referred to as continuously taken "image."

Embodiments

Hereinafter, one embodiment of the present invention will be described. The embodiment relates to a technique for synthesizing a plurality of continuously taken images. However, the technique is also applied to a plurality of continuously taken images while changing predetermined parameters thereof. In addition, the present embodiment relates to a technique in which a user rubs a screen on which an image is displayed, and accordingly, continuously taken other images are synthesization-processed in response to the rubbing motion thereof. Therefore, the technique relates to a user's operation system.

[Principle Explanation]

Figure 3:
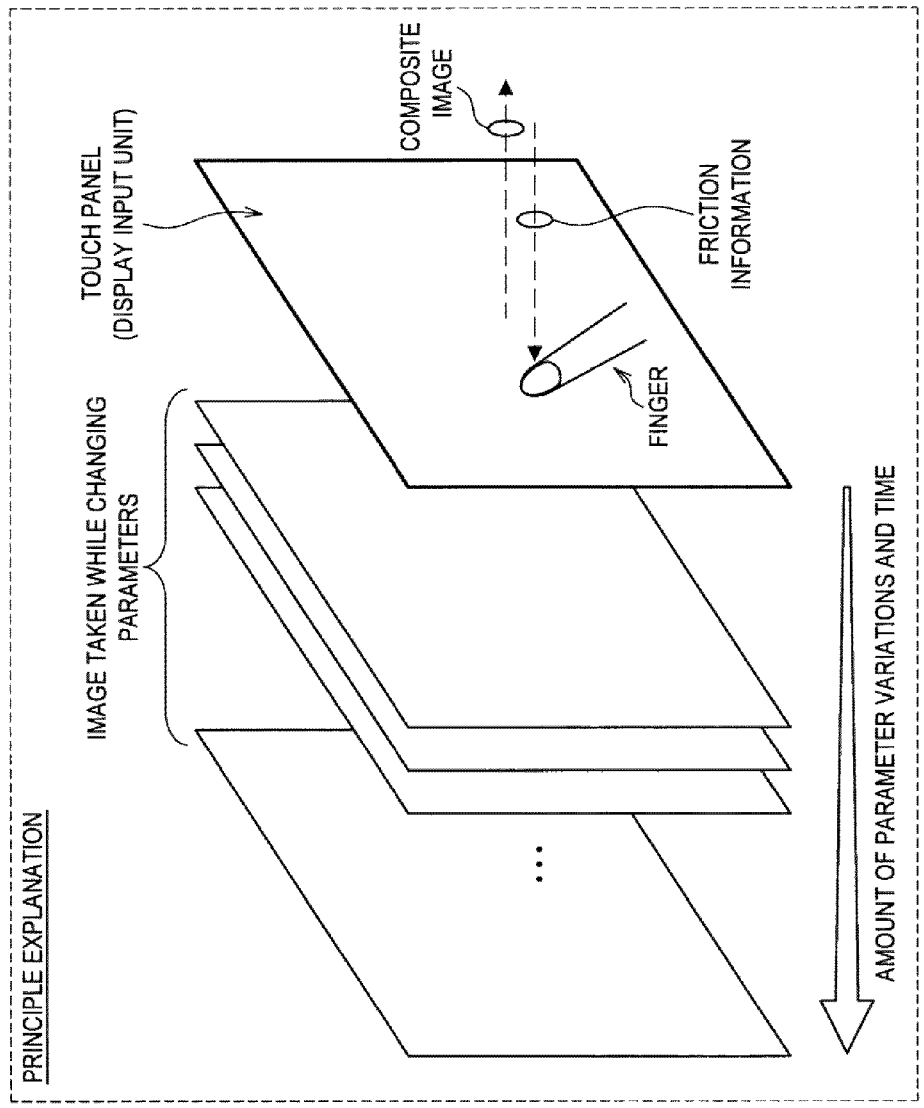
FIG. 3 is a principle explanation view of an image processing technique according to one embodiment of the present invention.

First, the principle of a method of the present embodiment will be described with reference to FIG. 3. FIG. 3 is a principle explanation view for explaining the principle of a technique according to the present embodiment.

A touch panel and a plurality of continuously taken images are schematically shown in FIG. 3. These images represent images which were continuously taken while changing parameters. However, it is noted that, even if parameters relating to an imaging mechanism are not intentionally changed by a user at a continuous imaging time, "time" is one parameter that is changed. For example, the parameters relating to the imaging mechanism include: depth of field, effect, backlight correction, flash, and the like.

The depth of field is determined depending on focal length, aperture value, and the like. For example, the shorter the focal length is, the deeper the depth of field is, and the narrower the aperture is, the deeper the depth of field is. As an effect, one in which an effect is implemented by a lens filter and various kinds of digital filters, or an effect in which arbitrary background images are synthesized may be exemplified the whole image is changed to sepia. As the effect by the lens filter, a polarizing filter, a neutral density filter, a color correction filter, a color emphasis filter, and the like. Incidentally, for example, with regard to the flash, switching of lighting/extinction and the amount of adjustment of luminance become parameter values.

A plurality of continuous images taken while changing such parameters is arranged along a changing direction of the parameters (time-dependent direction) in FIG. 3. In fact, image data are aligned based on information at an imaging time, and accordingly, the image data is aligned along the changing direction of the parameters. However, it is noted that, typically, the image data is arranged and controlled based on the information at the time of imaging, and therefore, a user is not asked for a special operation. An image located at the beginning of such aligned image data is displayed on a touch panel. That is, a first image taken in the plurality of continuously taken images is displayed on the touch panel.

In this case, the user rubs the surface of the touch panel with a finger while watching the image displayed on the touch panel, and accordingly, the displayed image and another image can be synthesized for a pixel area rubbed by the finger. At this time, in the present embodiment, friction information such as a position or an area rubbed by the user finger, the number of finger reciprocation times on the position or the area, press force, the number of the fingers, finger movement speed, or the like is used for a synthesizing process of the images in the synthesizing process, for example, an image large amount of parameters is synthesized in response to the number of the finger reciprocation times, the pressing force, or the like. At this time, only the position or the area rubbed by the user finger is synthesized. Therefore, the user can perform synthesizing process for only a portion of the image via a simple operation.

For example, in case 2 shown in FIG. 2, the image P(t1) is displayed on the touch panel. As described above, the image P(t1) does not conform to the photographer's intention, as object A has blinked. On the other hand, with regard the image P(t2), object B has also blinked, and therefore, this image also does not conform to the photographer's intention.

However, if one portion (periphery of an eye) of the object A shown up in the image P(t1) is replaced with one portion (periphery of an eye) of the object A shown in the image P(t2), an image conforming to the photographer's intention is formed. Consequently, the user performs rubbing motion on one portion (periphery of the eye) of the object A via his/her finger while watching the image P(t1) displayed on the touch panel. By performing this motion, only a rubbed portion in the image P(t1) is gradually synthesized with the image P(t2), and is finally replaced with one portion of the object A shown in the image P(t2). As a result, there a desired image can be obtained in which neither object A nor object B blinks.

As described above, the technique according to the present embodiment is one in which a user's intended synthesization position, synthesization range, degree of synthesization, or the like, is changed via the rubbing motion of the user, and thus a composite image is formed by a series of motions performed by the user. In addition, the operation performed by the user only a motion for rubbing the surface of the touch panel, and thus it is possible to perform the image synthesizing process with a very simple operation, as compared with an image processing application or the like. That is, the technique according to the present embodiment provides such an operation system with a high of convenience.

Incidentally, in the above description, the description of the touch panel is used as one example of the display means and the input means. In addition, as another means other than having a finger rub the touch panel, a stylus or the like may be used, for example. Furthermore, the first continuously taken images do not have to be displayed on a screen of the touch panel, for example, an image at a imaging time point designated by a user and an image corresponding to a predetermined imaging time point may be displayed. In addition, when the touch panel is rubbed by a plurality of user fingers, it may be configured so that synthesized images are restored. As described above, the present embodiment is not limited to this, and as such, various modifications may be made.

As described above, the principle of the present embodiment will be described. Hereinafter, a functional configuration and a series of motions of the specific image processing apparatus 100 which is for achieving the technique according to the present embodiment will be described. The description has been made by using an expression of "image" as a synthesization processing object in order to assert the concreteness thereof. However, an expression of "image" which includes a broader meaning will be used in the following description.

[Functional Configuration of Image Processing Apparatus 100]

Figure 4:
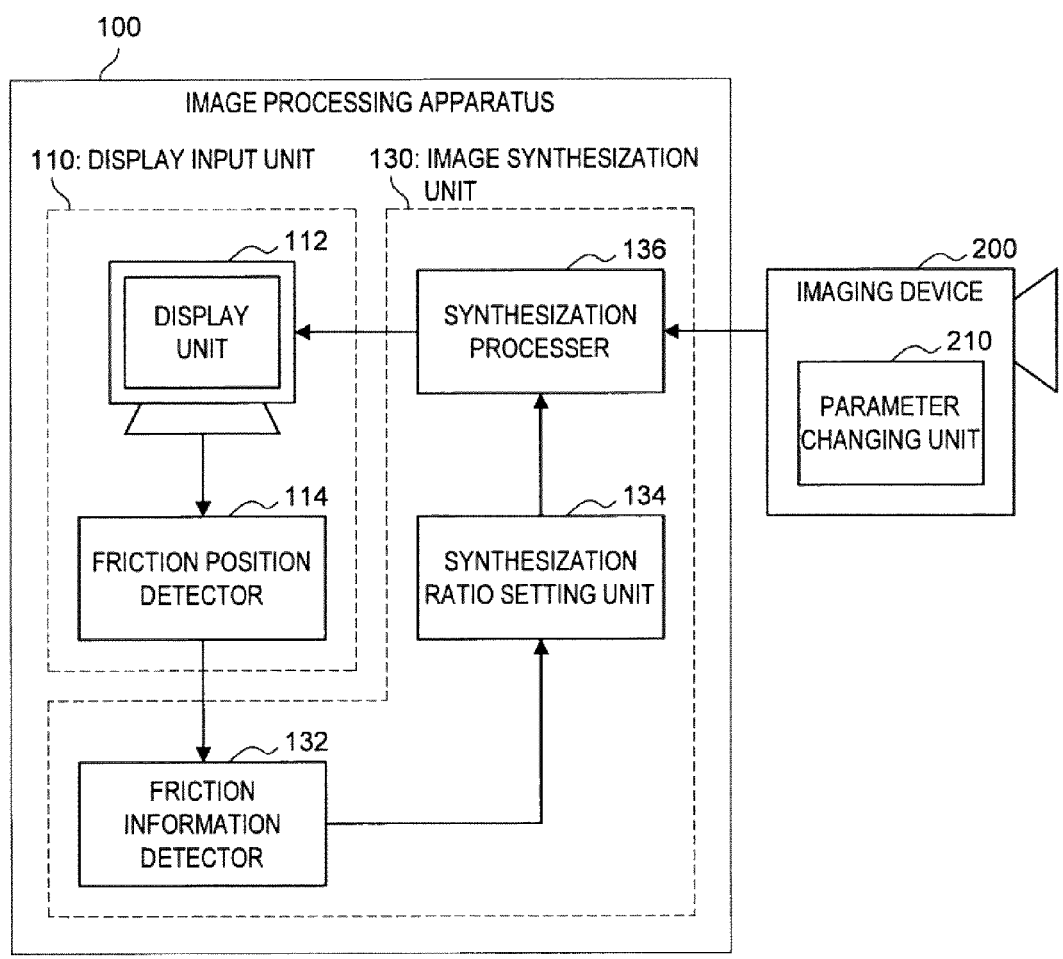
FIG. 4 is an explanation view showing a functional configuration of an image processing apparatus according to the present embodiment.

In this case, a functional configuration of the image processing apparatus 100 according to the present embodiment will be described with reference to FIG. 4. FIG. 4 is an explanation view showing a functional configuration of the image processing apparatus 100 according to the present embodiment. Incidentally, the imaging device 200 which provides continuously taken image data to the image processing apparatus 100 is also depicted in FIG. 4. An image processing system is formed by these imaging device 200 and image processing apparatus 100.

As shown in FIG. 4, the image processing apparatus 100 mainly includes a display input unit 110 and an image synthesization unit 130.

(Display Input Unit 110)

The display input unit 110 mainly includes a display unit 112 and a friction position detector 114. The above touch panel is one example of the display input unit 110.

The display unit 112 is a display device for displaying an image taken by the imaging device 200. In addition, the function of the display unit 112 is achieved by an output unit 918 of a hardware resource shown in FIG. 14. In addition, a friction position detector 114 is provided in the display unit 112. The friction position detector 114 may be integrally formed with the display unit 112, or may be separately formed. However, the friction position detector 114 is provided on a screen of the display unit 112, and an image displayed on the display unit 112 is configured so as to be transparently viewed.

The friction position detector 114 is one which detects a position rubbed by a user. More particularly, the friction position detector 114 is one that detects which position or area is rubbed by the user in the image displayed on the screen of the display unit 112. In addition, the friction position detector 114 may be configured so as to be able to detect a pressing force applied when the user rubs. Furthermore, the friction position detector 114 may have a function which detects the presence of a finger of am user in the space above the screen adjacent to the display unit 112, and recognizes it as a friction position, even if the user does not directly come in contact with the friction position detector 114. That is, the friction position mentioned in this case is one which may include position information for a motion performed by the user so as to depict with empty space above the screen of the display unit 112.

Such detected information of the friction position is input from the friction position detector 114 to a friction information detector 132 of the image synthesization unit 130.

(Image Synthesization Unit 130)

The image synthesization unit 130 mainly includes the friction information detector 132, a synthesization ratio setting unit 134, and a synthesization processor 136. Incidentally, the function of the image synthesization unit 130 can be achieved by a ROM 904, a RAM 906, a storage unit 920, or a CPU 902 based on a computer program recorded in a removable recording medium 928, of the hardware resources shown in FIG. 14.

(Friction Information Detector 132)

The friction information detector 132 detects various kinds of friction information based on the information of the friction position input by the friction position detector 114 of the display input unit 110. As the friction information, for example, there include a pixel area rubbed by the user, the number of reciprocating friction times of the pixel area, a friction speed, a friction direction, a shape of friction trace, or the like, may be included.

In the friction information detector 132, for example, the information of the friction position sequentially detected from the friction position detector 114 is stored, and the stored information is analyzed, and accordingly, the friction information can be detected. The friction information detected by the friction information detector 132 is input to the synthesization ratio setting unit 134. Hereinafter, for the sake of convenience of explanation, description will be made as the friction information provided that "the number of friction times" and "the pixel area" are detected.

(Synthesization Ratio Setting Unit 134)

The synthesization ratio setting unit 134 sets a synthesization ratio of an image based on the friction information detected by the friction information detector 132. The synthesization ratio of the image mentioned herein means a synthesization ratio at a time when a pixel value of the pixel area rubbed in an image (hereinafter, referred to as "display image") displayed on the display unit 112 and a pixel value of an image to be synthesized (hereinafter, referred to as "image to be synthesized") are synthesized. For example, the synthesization ratio setting unit 134 sets the synthesization ratio of the pixel value so as to increase the significance of the image to be synthesized with an increase in the number of friction times. However, when the images to be synthesized are switched in response to the number of friction times, the synthesization ratio is still fixed at 1 or 0.

In this case, a setting method of the synthesization ratio will be described with a specific example. First, three images (an image P(t1), an image P(t2), and an image P(t3), t1<t2<t3) are taken and input into the image processing apparatus 100 by the imaging device 200. In addition, the image P(t1) is displayed on the display unit 112. At this time, when the display unit 112 on which the image P(t1) is displayed is rubbed by the user, the friction position is detected by the friction position detector 114, and the number of friction times is input to the synthesization ratio setting unit 134 by the friction information detector 132.

When the number of friction times is one time, for example, a pixel value D1 of the pixel area of the image P(t1) rubbed by the user and a pixel value D2 of the pixel area of the image P(t2) are synthesized at 1:1, and a synthesization ratio is set so that a pixel value $D'=(D1+D2)/2$ is calculated. When the number of friction times is two times, for example, a pixel value D1 of the pixel area of the image P(t1) rubbed by the user and a pixel value D2 of the pixel area of the image P(t2) are synthesized at 1:2, and a synthesization ratio is set so that a pixel value $D'=(D1+2*D2)/3$ is calculated. By applying such a configuration, a state in which a display image is gradually changed to an image to be synthesized having large parameters along with an increase in friction.

On the other hand, when the image to be synthesized is switched in response to the number of friction times, the following occurs. When the number of friction times is one time, the pixel value D1 of the pixel area of the image P(t1) rubbed by the user is replaced with the pixel value D2 of the pixel area of the image P(t2). That is, the pixel value D' after synthesization corresponding to the pixel area becomes $D'=D2$. When the above expression is used, a synthesization ratio between the pixel value D1 and the pixel value D2 becomes 0:1. In addition, when the number of friction times is two times, the pixel value D1 of the pixel area of the image P(t1) rubbed by the user is replaced with a pixel value D3 of the pixel area of the image P(t3). That is, the pixel value D' after synthesization corresponding to the pixel area becomes D'=D3. When the above expression is used, a synthesization ratio between the pixel value D1 and the pixel value D3 becomes 0:1.

The above setting method is one example, and the present embodiment is not limited to this. However, by using such a setting method, a synthesization ratio corresponding to the friction information can be set. In addition, a synthesization method of the image will be described in detail at hereinafter. The synthesization ratio set by such a manner is input to the synthesization processor 136.

(Synthesization Processor 136)

The synthesization processor 136 displays an image corresponding to a first or predetermined imaging time point of a continuously taken image group on the display unit 112. Subsequently, the user performs a rubbing motion on a screen of the display unit 112 while watching the image displayed on the display unit 112. Friction information is detected in response to the rubbing motion, and a synthesization ratio is set by the synthesization ratio setting unit 134 in response to the friction information. When the synthesization ratio is input, the synthesization processor 136 synthesizes the image continuously taken by the imaging device 200 with the image displayed on the display unit 112 based on the synthesization ratio set by the synthesization ratio setting unit 134. Furthermore, the synthesization processor 136 displays the image after synthesization on the display unit 112 and displays the same to the user again.

(Detail Description of Image Synthesization Process)

Figure 5:
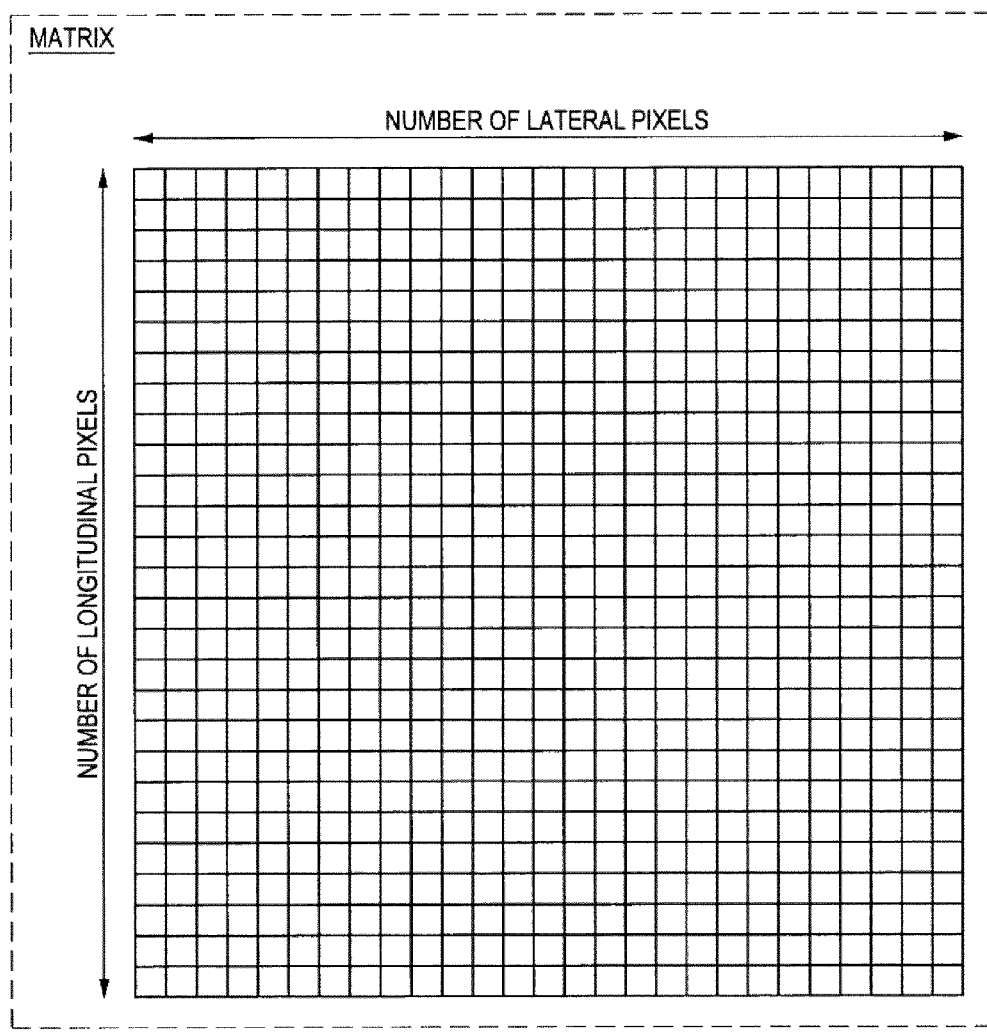
FIG. 5 is an explanation view showing one example of a matrix corresponding to a pixel of an image sensor.
Figure 7:
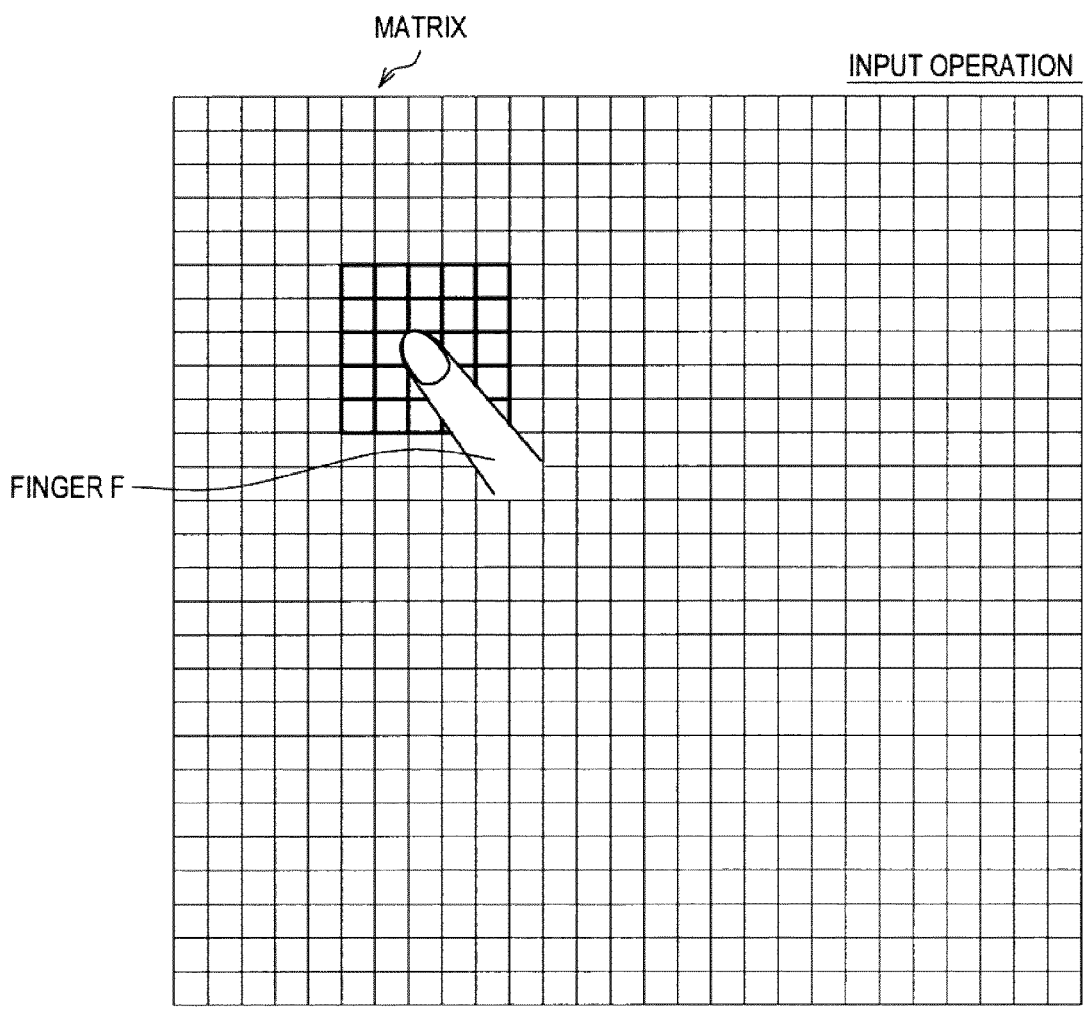
FIG. 7 is an explanation view showing one example of input operation according to the present embodiment.

Now, the above image synthesization process will be described in detail with reference to FIGS. 5 to 9. FIG. 5 is an explanation view showing a matrix corresponding to the number of pixels of an image. FIG. 6 is an explanation view showing one example of a brush matrix. FIG. 7 is an explanation view showing one example of input operation. FIG. 8 is an explanation view showing one example of a depth matrix.

First, FIG. 5 will be referred to. The image synthesization unit 130 holds information of the matrix shown in FIG. 5. The matrix shows a data storage area with the same size as the number of image pixels, for example, the data storage area is matrix data in which depth information is held in each cell. The depth mentioned in this case is an index showing the depth at which image is displayed (synthesized) via ratio of the amount (thereof). First, a predetermined value is stored in the matrix, and the depth stored in the matrix is updated in response to friction motion by a user. In response to the depth, a imaging time point of an image to be synthesized, which is synthesized by the image synthesization unit 130, is determined, and a ratio of an image to be synthesized, which is synthesized with a display image, is set.

After that, FIG. 6 will be referred to. FIG. 6 is the brush matrix which is for updating a matrix value corresponding to the pixel area rubbed by the user. That is, the brush matrix is one for setting a depth to be added to a matrix value. In this example, a brush matrix having a size of 5 pixels by 5 pixels set. In addition, the brush matrix has a central value which is 1.0, and has depth which is set so that the value decreases toward an external thereof. When a position rubbed by the user is detected, the position is adjusted so that the pixel of the detected position coincides with the center of the brush matrix, and the brush matrix value is added to the matrix value.

First, as shown in FIG. 7, a certain pixel area is rubbed by the user. In FIG. 7, the position rubbed by a user's finger and the matrix position are typically depicted so as to clarify the corresponding relationship between both positions. In fact, the matrix is matrix data, and therefore, the matrix is not directly pressed as shown in FIG. 7. However, the image synthesization unit 130 acquires information of the position pressed by the user and recognizes the position on the matrix similar to an image-shown in FIG. 7. When the rubbing motion by the user is performed, the depth stored in the brush matrix is added to the matrix value by the image synthesization unit 130. The conditions are shown in FIG. 8.

An example shown in FIG. 8 is one showing the matrix in a state where a depth of 10.0 is stored in each cell of the matrix as an initial value, and the brush matrix value is added to the position rubbed by the user. As shown in FIG. 7, when the pixel area is rubbed by the user, the position of the brush matrix is adjusted so as to coincide with the pixel area via the image synthesization unit 130. Then, the depth value stored in each cell of the brush matrix is added to a depth value stored in each cell of the matrix corresponding to each cell of the brush matrix by the image synthesization unit 130. When the brush matrix is set as shown in FIG. 6, the matrix after addition becomes one such that as shown in FIG. 8.

When the same pixel area is repeatedly rubbed by the user, a matrix value of a rubbed area thereof is repeatedly added. Therefore, the depth value stored in the matrix is increased along with an increase in the number times that friction is applies. In addition, it may be configured such that the brush matrix value is added a plurality of times in response to a time at which the user continues to come in contact with the same pixel area and the pressure with which the pixel area is pressed. Furthermore, when the user rubs a certain pixel area, it may be configured such that the smaller or the larger the friction velocity is, the greater the number of times is the brush matrix increases. By applying such a configuration, it is possible for the image synthesization unit 130 to control the matrix value in response to various kinds of friction information.

The depth of each pixel obtained by such a manner is used for determination of the displayed image and determination of a synthesization ratio. In the case of these determinations, for example, a conversion table such as that shown in FIG. 9 used. The conversion table shown in FIG. 9 is one for determining a display image. The conversion table is composed of a column showing a value range in which the matrix value is included and a column showing an image section corresponding to the value range.

For example, when a matrix value (depth) corresponding to a certain pixel is 11.0, the pixel is included in a value range of 10.0 to 20.0 corresponding to "an image 1 and an image 2." Therefore, the pixel value of the pixel is calculated using the pixel values of the image 1 and the image 2, which correspond with each other. In addition, a synthesization ratio, in the case of synthesizing the pixels of the image 1 and the image 2, is determined in response to the matrix value by the synthesization ratio setting unit 134. When the depth is 11.0, the synthesization ratio between a pixel value D1 of the image 1 and a pixel value D2 of the image 2 is determined to D1:D2=9:1, for example. Therefore, a pixel value D' of the composite image becomes D'=0.9*D1+0.1*D2.

When a pixel value D has values of R, G, and B corresponding to three primary colors, a pixel value D' (R', G', and B') are synthesized are expressed by the following equation (1) after synthesization in which a pixel value D1 (R1, G1, and B1) and a pixel value D2 (R2, G2, and B2). As a result, the pixel area rubbed by the user in the image 1 and the image 2 is displayed by being alpha-blended in such a manner. Incidentally, the pixel value of the composite image is calculated by similarly synthesizing the pixel value for another color space expression such as YCbCr, CMYK, or the like.

$$R' = R1*0.9 + R2*0.1$$

$$G' = G1*0.9 + G2*0.1$$

$$B' = B1*0.9 + B2*0.1 \qquad (1)$$

Next, the conversion table shown in FIG. 9 will be further explained. In the conversion table shown in FIG. 9, when the matrix value is a value range of 0.0 to 10.0 or a value range of 20.0 to 30.0, the image to be displayed is only set to the image 1 or the image 2, respectively. That is, even if the rubbing motion by the user is repeated and the matrix value is gradually increased, it enters a state where the pixel value in the rubbed pixel area is fixed by the image to be synthesized during that depth after the addition thereof is included in the value range. This state is one which is called "storing".

For example, with regard to case 2 shown in FIG. 2, the user would consider replacing only one portion (periphery of the eye of the object A) of the image P(t2) which had been taken temporally later with the image P(t1) directly. When the above "storing" does not occur, the user carefully searches for a moment at which the image P(t2) is displayed separately while checking displayed composite images and repeating the rubbing motion. In addition, when such a moment is overshot, the pixel value becomes a synthesized one, so that image quality degrades. However, if the above "storing" is set, even the rubbing motion is performed to some extent after the image P(t2) is separately displayed, the pixel value is not changed. Therefore, the user may repeat the rubbing motion while referring displayed images to find the time at which the image P(t2) is separately displayed with ease and without anxiety.

As described above, the image synthesization process has been described in detail. As mentioned above, a part of an image continuously taken by the imaging device 200 is synthesized in response to user's rubbing motion by the synthesization ratio setting unit 134 and the synthesization processor 136 of the image synthesization unit 130. The synthesized image is input to the display unit 112 of the display input unit 110 and displayed to the user. In this regard, however, an image after synthesization is displayed on the display unit 112 each time the image is synthesized by the synthesization processor 136.

As described above, the image processing apparatus 100 according to the present embodiment is one which synthesizes a plurality of continuously taken images in response to the frictional motion by the user. More particularly, the image processing apparatus 100 has a configuration which switches the images to be synthesized in response to the friction information and adjusts the synthesization ratio. As described above, by applying the configuration of the image processing apparatus 100, an operation system is achieved in which only a part of the image is smoothly synthesized in response to the friction motion by the user, and thus the user may obtain an image conforming to user's intention by a simple operation.

[Functional Configuration of Imaging Device 200]

Now, a functional configuration of the imaging device 200 will be simply described with reference to FIG. 4. However, functions of the imaging device 200 are achieved by a hardware configuration shown in FIG. 15.

Of the functions included in the imaging device 200, an important one for the present embodiment is the function of the parameter changing unit 210. The parameter changing unit 210 has a function which changes various controllable kinds of parameters for each image unit in the case where the imaging device 200 performs continuous imaging. As parameters controlled by the parameter changing unit 210, may be exemplified the depth of field, effect, backlight correction, flash, and the like. These parameters are gradually changed and object images are continuously taken by the parameter changing unit 210. However, the changing of the parameters may be automatically carried out by the parameter changing unit 210 or may be manually carried out by the user.

[Operational Explanation of Image Processing Apparatus 100]

Next, operational explanation of the image processing apparatus 100 according to the present embodiment will be described with reference to FIG. 10. FIG. 10 is an operational explanation view schematically showing the operation of the image processing apparatus 100 according to the present embodiment. In this case, however, an example showing the correction of blinking in a person's image will be described.

Figure 10:
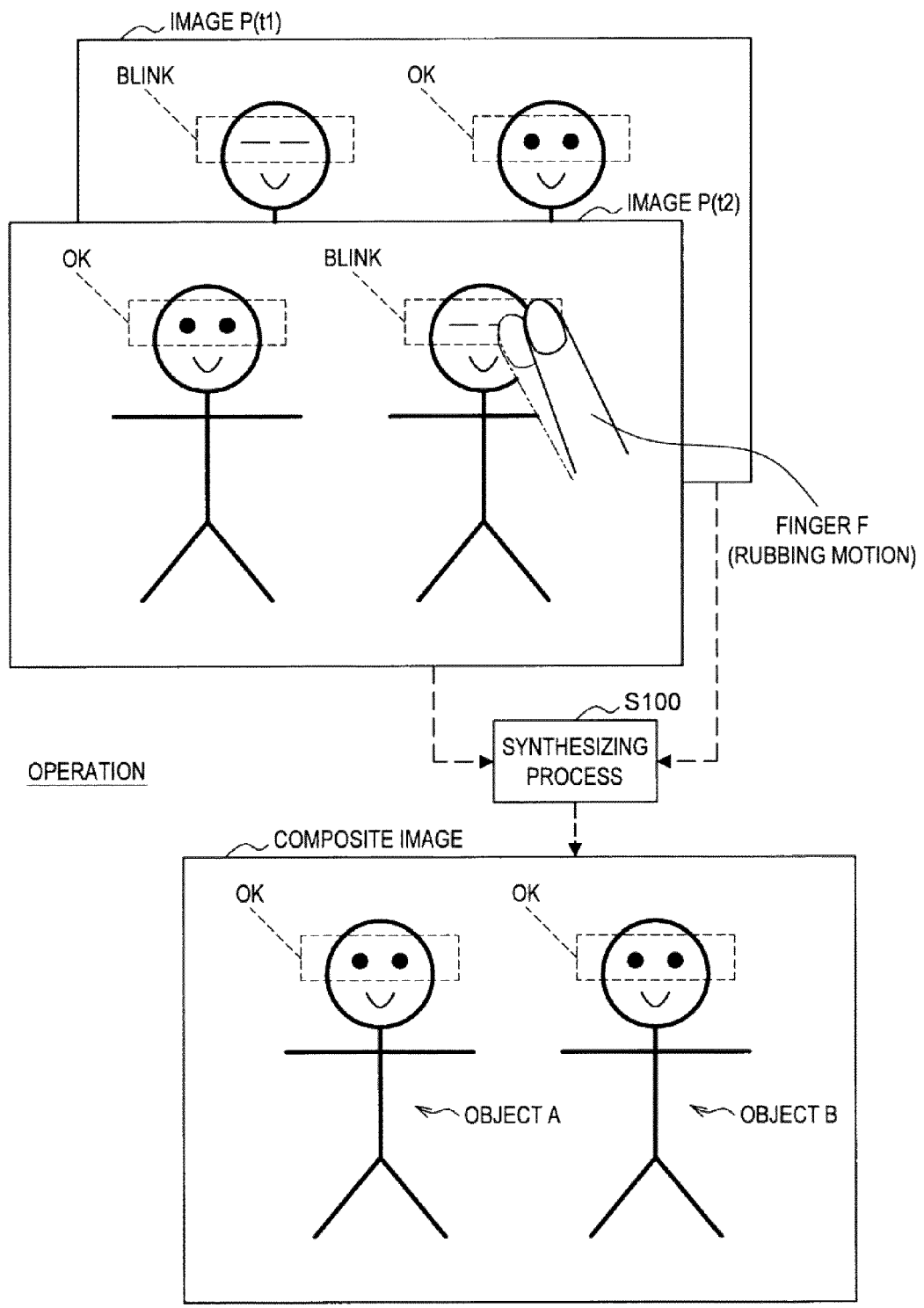
FIG. 10 is an operational explanation view of an image processing apparatus according to the present embodiment.

An image P(t1) taken at a time t1 and an image P(t2) taken at a time t2 are depicted in FIG. 10. The times t1 and t2 are continuous imaging times. In addition, two object images (an object A and an object B) are shown in the images P(t1) and P(t2).

The object A included in the image P(t1) is one taken at the moment. On the other hand, the object B included in the image P(t1) does not blink, and thus is in a state conforming to a photographer's intention (OK). In addition, the object A included in the image P(t2) does not blink, and thus is in the state conforming to the photographer's intention (OK). On the other hand, the object B included in the image P(t2) is one taken at the moment of blinking. In this case, a user would consider replacing an eye portion of the object B shown in the image P(t2) with that of image P(t1).

At this time, as shown in FIG. 10, the user can synthesize the image of the image P(t1) corresponding to a friction area thereof only by rubbing periphery of the eye of the object B shown in the image P(t2). That is, when a pixel area of the image P(t2) is rubbed by the user, the image processing apparatus 100 synthesizes the images of the image P(t2) and the image P(t1) corresponding to the pixel area (S100). By such a synthesizing process, both the object A and the object B are formed as composite images in which there is no blinking, as desired by the user.

As described above, the user can advance a frame by rubbing the periphery of the person's blinked eye. As described above, it is possible to change depth by a position and an area intended by the user by changing only the rubbed area without changing the whole image.

(Detail of Synthesization Process S100)

Figure 11:
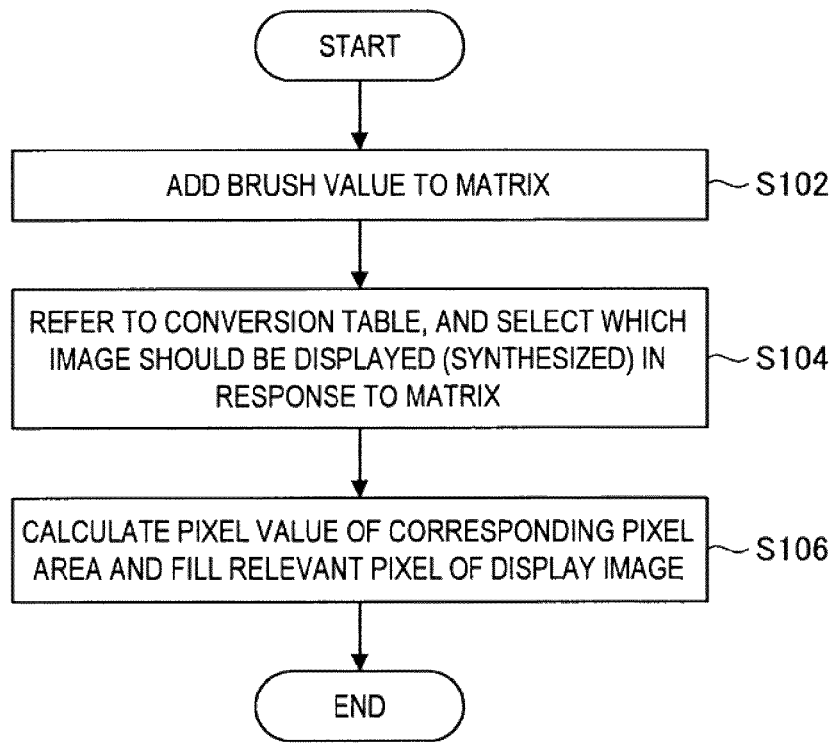
FIG. 11 is an explanation view showing a flow of a depth calculation process according to the present embodiment.

Now, a flow of the synthesization process S100 by the image processing apparatus 100 will be described in detail with reference to FIG. 11. FIG. 11 is an explanation view showing a flow of a synthesization process by the image processing apparatus 100 according to the present embodiment. A series of processes shown in this case is achieved by mainly the function of the image synthesization unit 130 of the functional configuration included in the image processing apparatus 100.

As shown in FIG. 11, first, the image synthesization unit 130 makes the position of the brush matrix coincide with a pixel area of the position rubbed by the user, and adds a depth value stored in each cell of the brush matrix to the matrix value (S102). Then, the image synthesization unit 130 selects an image to be synthesized (displayed) by selecting an image corresponding to the matrix value with reference to the conversion table (S104). After that, the image synthesization unit 130 calculates a pixel value of the pixel area rubbed by the user, fills a corresponding pixel as a pixel value which constitutes a display image after synthesization (S106), and completes a series of processes. By applying these processes, a composite image corresponding to the user's friction motion is formed.

Application Example 1

Firework Imaging

Figure 12A:
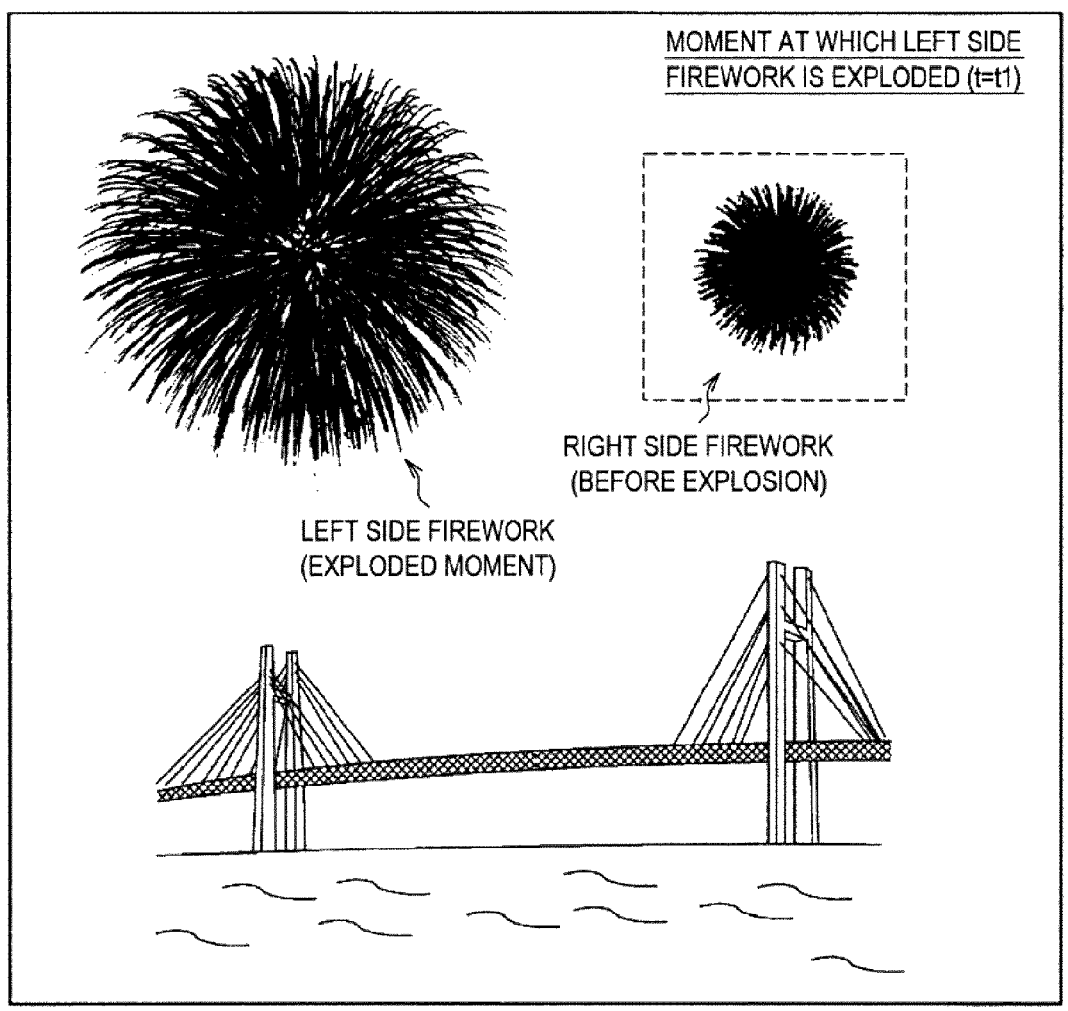
FIG. 12A is an explanation view showing an example of one object image taken by continuous imaging.
Figure 12B:
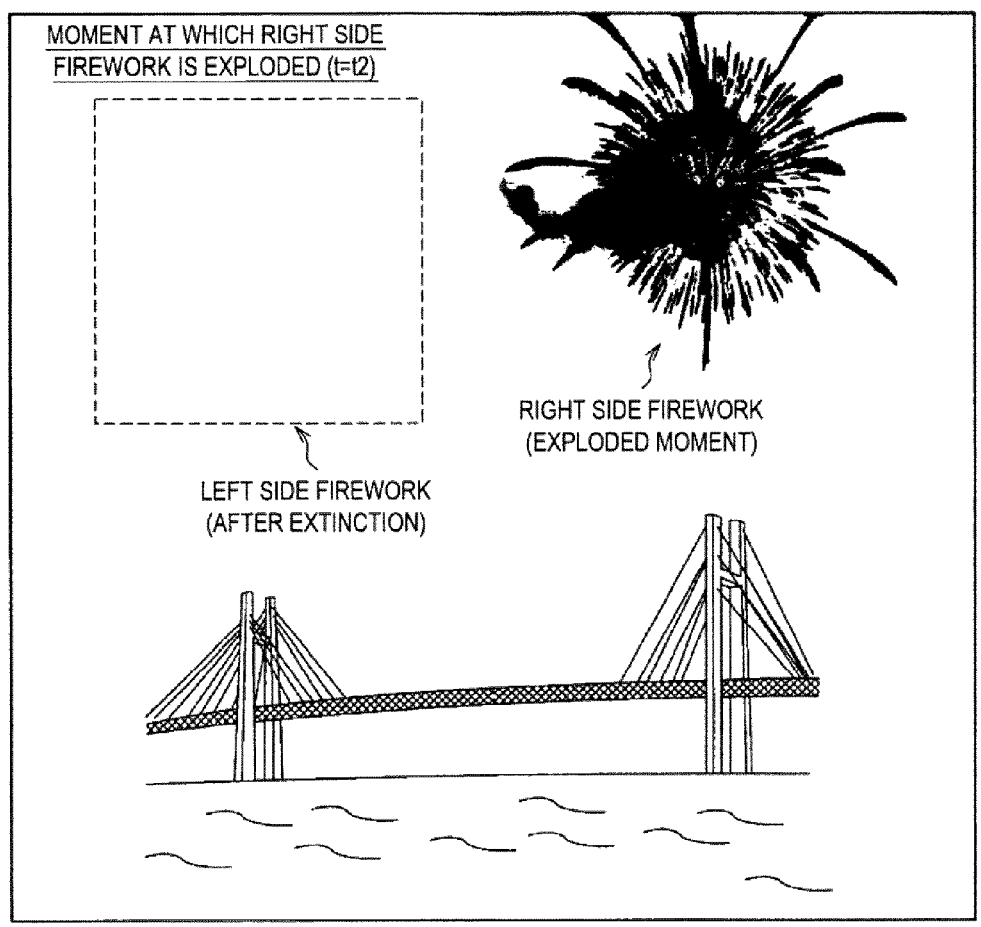
FIG. 12B is an explanation view showing an example of one object image taken by continuous imaging.
Figure 12C:
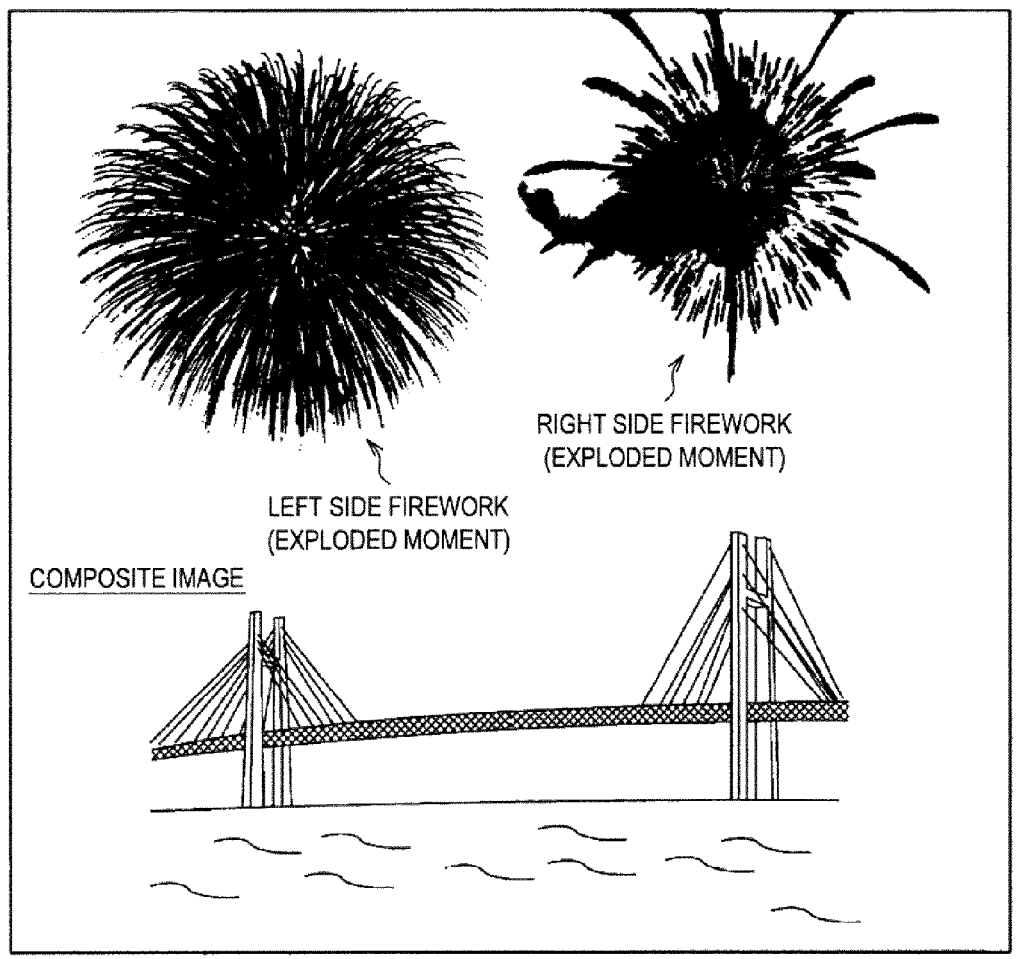
FIG. 12C is an explanation view showing one example of a composite image according to the present embodiment.

Next, one example application of the present embodiment will be described with reference to FIGS. 12A to 12C. FIGS. 12A to 12C are explanation views showing examples when the technique according to the present embodiment is applied to a stage of firework imaging. The stage of firework imaging shown in the present case is an example of a case where an object image intended by a photographer appeared in a time difference. As described above, the image processing apparatus 100 according to the present embodiment is also preferably used for a stage where it is not possible to control a state of the object.

FIGS. 12A to 12C are those typically showing continuously taken images intended for moments at which two fireworks are exploded. Incidentally, these series of images are those imaging a state where a firework on the left side exploded first, and a few minutes later, a firework on the right side exploded thereafter.

First, FIG. 12A will be referred to. A imaging time point of FIG. 12A is a moment at which the firework on the left side is exploded. As for the firework on the left side, as intended by the photographer, the image is made at a state where the firework is fully exploded. However, at this imaging time point, the firework on the right side is before an explosion occurs, and the firework is smaller in diameter than that of the photographer's intention.

Next, FIG. 12B will be referred to. A imaging time point of FIG. 12B is a moment at which the firework on the right side is exploded. As for the firework on the right side, as intended by the photographer, the image is made at a time where the firework is fully exploded. However, at this imaging time point, the firework on the left side has already disappeared. Consequently, the photographer will consider replacing the firework on the right side shown up in the image shown in FIG. 12A with the firework on the right side shown up in FIG. 12B. Consequently, there is used the technique of the present embodiment in which time can be advanced by the rubbed area.

First, the photographer performs a rubbing operation in a frame which surrounds the firework on the right side in the image shown in FIG. 12A. Then, time is advanced by the inside of the rubbed frame, and therefore, the image of the firework on the right side shown in FIG. 12B is gradually synthesized and displayed. When the rubbing is further repeated, as shown in FIG. 12C, the image of the firework on the right side shown in FIG. 12B is completely synthesized, and a certain composite image is formed at a moment at which both the firework on the left side and the firework on the right side are exploded. Fundamentally, a moment at which two fireworks that are launched at different times are exploded at the same time is not captured. However, if the technology of the present embodiment is used, such a composite image can be easily formed.

Application Example 2

Scenery Imaging

Next, one example application of the present embodiment will be described with reference to FIG. 13. FIG. 13 is an explanation view showing an example of a case where the technique according to the present embodiment is applied to a stage of scenery imaging. The stage of the scenery imaging shown in this case is an example of a case where objects are present on the front and the back, and therefore, to focusing on the front and the back at the same time is not possible. As described above, the image processing apparatus 100 according to the present embodiment is also preferably used for a stage where imaging is difficult by any means.

An image P(t1) and an image P(t2) are depicted in FIG. 13. The image P(t1) is an image taken so as to be focused on the back. On the other hand, the image P(t2) is an image taken so as to be focused on the front. In the case where scenery is taken, when focusing on a back building, mountain, or the like, the front leaves or the like are out of focus. Conversely, when focusing on the front leaves or the like, the back building, mountain, or the like are out of focus. Even at such stages, a photographer will consider taking an image focusing on both the back and the front. Consequently, employing the technique of the present embodiment can move parameters (focus) via rubbed area.

First, the photographer performs continuous imaging while changing depth of field. Next, the photographer performs rubbing operation within a frame which surrounds a front object in the image P(t1). Then, the depth of field is brought forward by the inside of the rubbed frame, and therefore, an image of the image P(t2) is gradually synthesized and displayed. When the rubbing is further repeated, as shown in FIG. 13 as a composite image, a front image included in the image P(t2) is completely synthesized, and a composite image focusing on both the back object and the front object is formed. Fundamentally, an image focusing on the back and the front at the same time is not obtained. However, if the technique of the present embodiment is used, it becomes possible to easily forming such a composite image becomes easy.

As described above, two examples application according to the present embodiment are shown. Of course, the application range of the present embodiment is not limited to this, various applications can be made in response to kinds of friction information and kinds of parameters.

[Hardware Configuration Example of Image Processing Apparatus 100]

Figure 14:
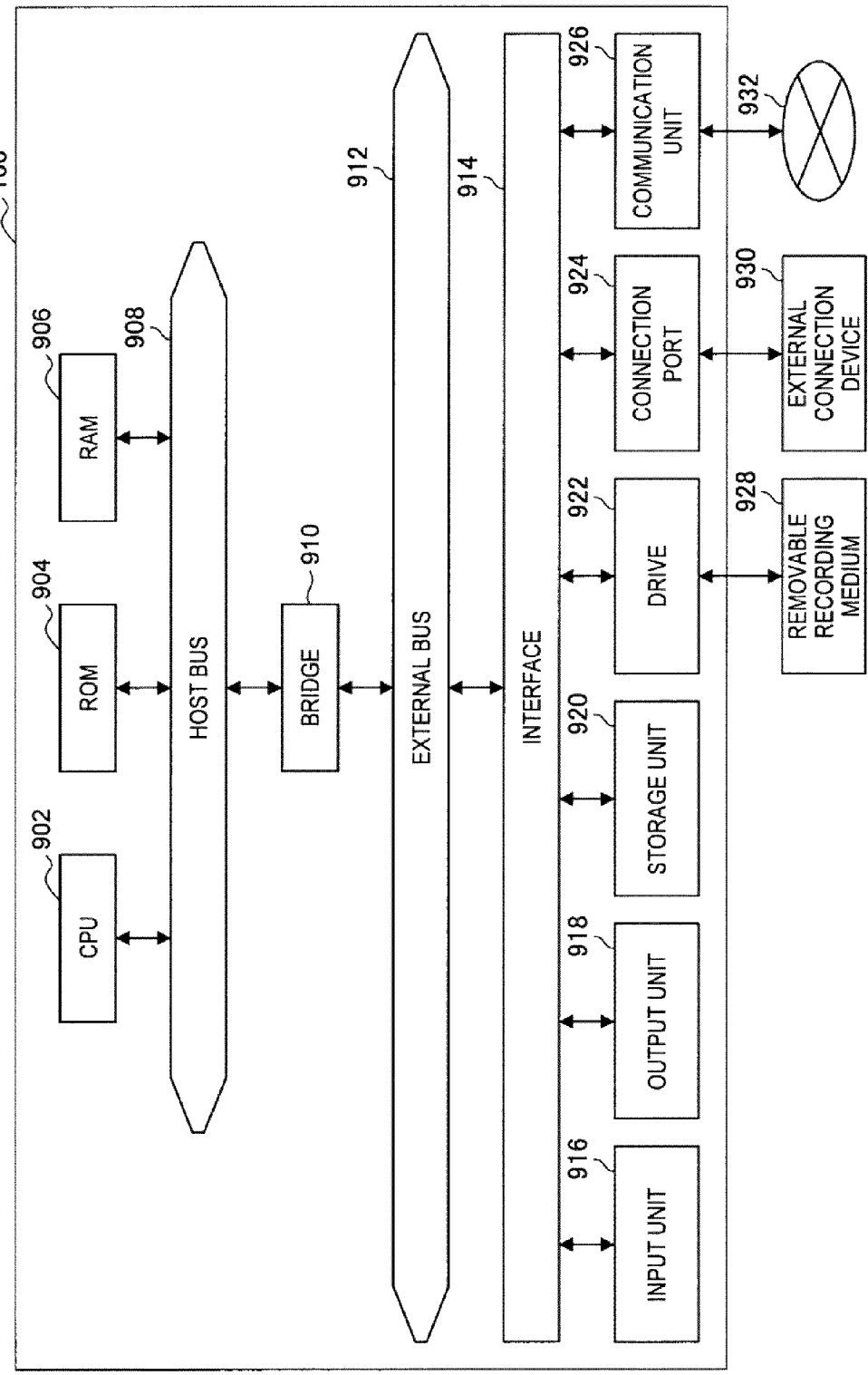
FIG. 14 is an explanation view showing an example of a hardware configuration of an image processing apparatus (information processing apparatus) according to the present embodiment.

The functions of respective constituent elements included in the above image processing apparatus 100 can be achieved by, for example, an information processing apparatus which has a hardware configuration shown in FIG. 14, and by using a computer program for achieving the above functions. FIG. 14 is an explanation view showing a hardware configuration of the information processing apparatus capable of achieving the functions included in the respective constituent elements of the above image processing apparatus 100. Configurations of the information processing apparatus are optional, for example, configurations, such as a personal computer; a personal digital assistance, such as a mobile phone, a PHS (Personal Handy-phone System), a PDA (Personal Digital Assistant), or the like; a game appliance; various kinds of home information appliances; or the like.

As shown in FIG. 14, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removable recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. Generally, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wired or wireless connected network. For example, the Internet, a home-use LAN, infrared communication, broadcasting, satellite communication, or the like is used.

[Hardware Configuration Example of Imaging Device 200]

Figure 15:
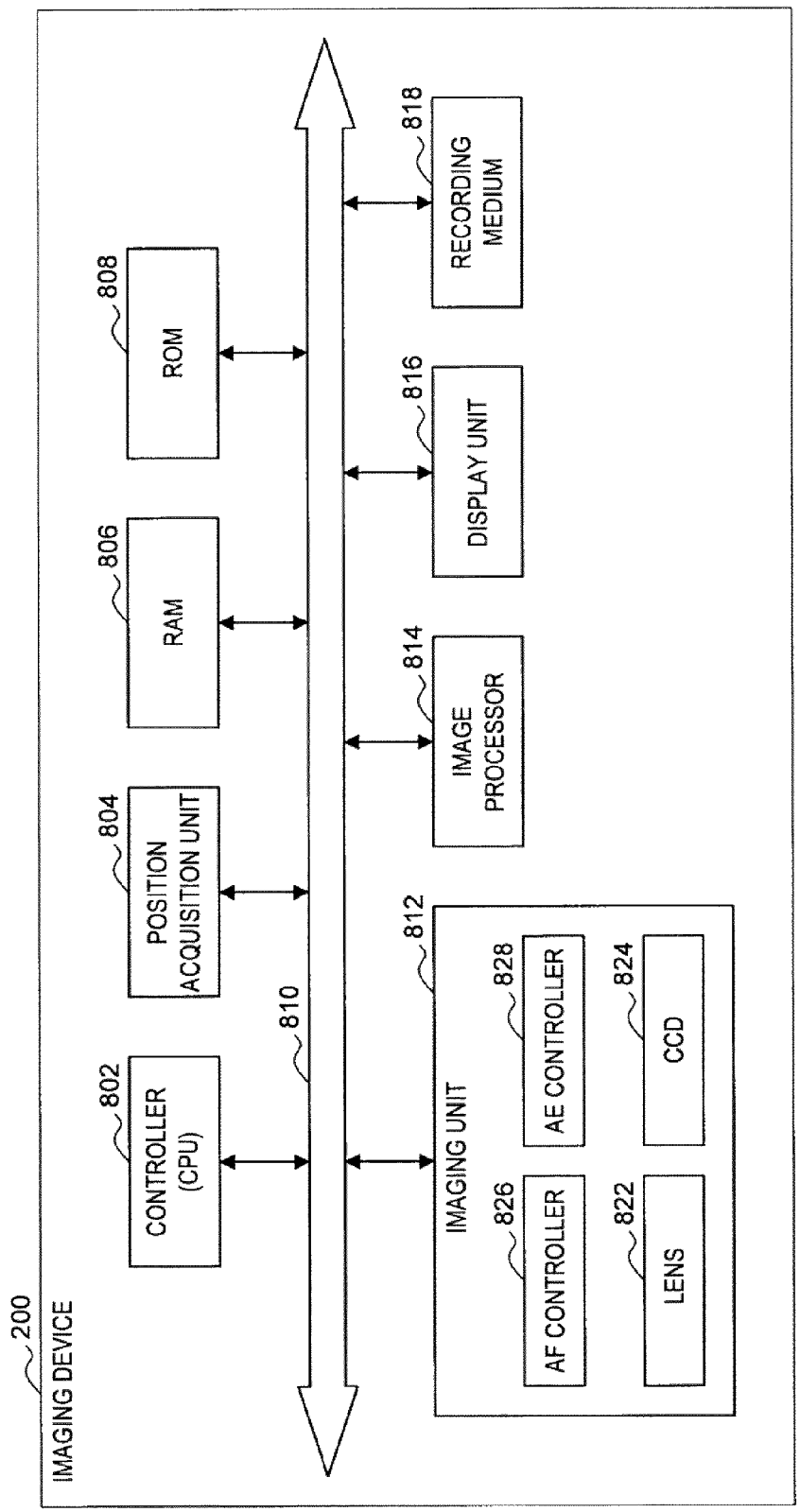
FIG. 15 is an explanation view showing an example of a hardware configuration of an imaging device according to the present embodiment.

Next, the hardware configuration example of the above imaging device 200 will be described. The functions of respective constituent elements included in the above imaging device 200 can be achieved by, for example, a hardware configuration shown in FIG. 15. FIG. 15 is an explanation view showing one example of the hardware configuration capable of achieving the functions included in the above the respective constituent elements of the above imaging device 200.

As shown in FIG. 15, the imaging device 200 mainly includes a controller (for example, CPU; Central Processing Unit) 802, a position acquisition unit 804, a RAM (Random Access Memory) 806, a ROM (Read Only Memory) 808, a bus 810, an imaging unit 812, an image processing unit 814, a display unit 816, and a recording medium (for example, flash memory or the like) 818.

Although not shown in the drawing, an input unit which receives operation by a user may be further included. The function of the input unit is achieved by an operation means, for example, a mouse, a keyboard, a touch panel, a button, a switch, a lever, and the like. In addition, the input unit may be a remote controller capable of sending a control signal by using infrared rays, other radio waves, light waves, or the like.

The controller 802 is achieved by, for example, CPU or the like, and controls the whole operation or a part thereof, of the respective constituent elements based on various programs recorded in the RAM 806, the ROM 808, the recording medium 818, or the like. The ROM 808 stores, for example, a program to be read by the controller 802, data for use in calculation, or the like. The RAM 806 temporarily or permanently stores, for example, a program to be read by the controller 802, various parameters or the like which appropriately change in the case of executing the program. These constituent elements are connected with each other by, for example, the bus 810 which is capable of high speed data transmission.

The position acquisition unit 804 is means which acquires position information of the imaging device. The position information acquisition unit 804 may access, for example, a communicable base station, and acquire information of an area where the base station covers as the position information, or may acquire position information from a positioning satellite system (GPS; Global Positioning System) or the like. As the position information, for example, there includes information capable of specifying a latitude, longitude, or area where the imaging device 200 is located.

The imaging unit 812 is means which acquires an object image via an optical system. The imaging unit 812 mainly includes a lens 822, a CCD (Charge Coupled Device) 824, an AF controller 826, and an AE controller 828.

The lens 822 constitutes the optical system, and converges light reflected by the object to the CCD 824. The CCD 824 is a solid state image sensor which is configured by a semiconductor element, receives the light, which is converged by the lens 822, by each element, performs photoelectric conversion of the received light and outputs. The CCD 824 outputs an electrical signal in response to the intensity of the light received by each element, and therefore, an image signal can be formed based on the electrical signal. Incidentally, the imaging device 200 may use an image sensor which is formed by other semiconductor element in place of the CCD 824. The AF controller 826 is an auto focusing mechanism which is for automatically adjusting focus. In addition, the AE controller 828 is an automatic exposure (AE; Automatic Exposure) control mechanism which is for automatically adjusting shutter speed and aperture value.

The image processing unit 814 can convert the image signal output from the CCD 824 to a format of image data capable of being displayed on the display unit 816. For example, the image processing unit 814 can convert the image signal to image data corresponding to a coding format such as a BMP (Microsoft Windows Bitmap Image), a GIF (Graphics Interchange Format), a JPEG (Joint Photographic Experts Group), a PICT, a PING (Packet INternet Groper), or the like. In addition, the image processing unit 814 changes the size of the image data, adjusts luminance and color tone, adjusts gamma correction and sharpness, and the like. Further, the image processing unit 814 can form moving image data from a plurality of image signals continuously taken by the imaging unit 812.

The display unit 816 is a display device such as an LCD (Liquid Crystal Display), a PDP (Plasma Display Panel), an ELD (Electro-Luminescence Display), or the like, and is a device capable of visually notifying a user of acquired information.

The recording medium 818 is configured by a magnetic disc, an optical disk, a magneto-optic disk, a semiconductor memory, or the like. For example, the recording medium 818 is a DVD media, a Blu-ray media, an HD, a DVD media, a CompactFlash (registered trademark), a memorystick, an SD memory card (Secure Digital memory card), an HDD (Hard Disk Drive), or the like. In addition, as the recording medium 818, the imaging device 200 may be configured so as to use, for example, an IC card (Integrated Circuit Card) equipped with a non-contact IC chip, an electronic devices, and the like.

CONCLUSION

Finally, a functional configuration included in the image processing apparatus of the present embodiment and operational advantage achieved by the functional configuration will be simply put together.

First, the functional configuration of the image processing apparatus according to the present embodiment can be expressed as follows.

The image processing apparatus includes: a display screen displaying a first image included in a continuously taken image group, a friction position detector which detects a friction position on the display screen rubbed by a user, and an image synthesizing unit which synthesizes a pixel area of the first image corresponding to the friction position and a pixel area of a second image included in the image group. In this regard, however, the image synthesizing unit has a function to switch the second image to be synthesized with the first image so as to increase a imaging time difference between the first image and the second image with an increase in the amount of friction rubbed by the user.

As described above, the above image processing apparatus has the function of displaying the first image included in the continuously taken image group on the display screen. As for the first image, for example, it is configured such that an image at the most recent imaging time point of the images included in the image group is selected. In addition, the above image processing apparatus has the function of detecting the friction position on the display screen rubbed by the user by the friction position detector. The friction position is detected by the friction position detector, whereby a pixel area designated by the user is specified.

Furthermore, the above image processing apparatus has the image synthesizing unit by which the pixel area of the first image corresponding to the friction position and the pixel area of the second image included in the image group are synthesized. By being configured in such a manner, a part of the second image which is different at a imaging time point is synthesized with the first image. At this time, only the pixel area designated by the user is synthesized with the first image, and therefore, forming an image which is actually difficult to be taken is also possible. Furthermore, the synthesization process carried out by the image synthesizing unit is achieved by friction motion by the user, whereby a simple operation system with a high degree of convenience is provided. More particularly, operation in which the user designates the pixel area, setting operation of a synthesization ratio, and selection operation of an image to be synthesized can be achieved by only a series of rubbing motions, and therefore, very high convenience is provided.

In addition, the above image synthesizing unit switches the second image to be synthesized with the first image so as to increase the imaging time difference between the first image and the second image with the increase in the amount of friction rubbed by the user. By being configured in such a manner, it becomes possible for the user to sequentially switch the image to be synthesized by repeating the rubbing motion. As a result, the switching process of the image to be synthesized is incorporated in the series of friction motions, and therefore, an operation system with further high convenience is achieved.

In addition, the image synthesizing unit may be configured to increase a synthesization ratio of the second image to the first image with the increase in the amount of friction, and to switch the second image to an image in which imaging time difference from the first image is larger at a stage where the amount of friction exceeds a predetermined threshold. By being configured in such a manner, a switching process of the image to be synthesized and an adjusting process of the synthesization ratio of the display image and the image to be synthesized are achieved in response to the series of friction motions. That is, a composite image is seamlessly changed from the display image to the image to be synthesized by continuous friction motion. As a result, it becomes possible for the user to form the composite image by a more intuitive process.

Besides, the image synthesizing unit may be configured to display the second image which is before the switching to the pixel area till the amount of friction exceeds the predetermined threshold by a predetermined amount, and to switch the second image at a stage which exceeds the predetermined amount. By being configured in such a manner, after a part of the first image is completely switched to the second image, even the rubbing motion is continued, the second image is not switched by a predetermined time, and therefore, it becomes possible to find completely switched timing with ease. As a result, in the case where an image in which the part of the first image is completely replaced with the second image is intended, timing is correctly captured for "storing," and the user can forward the rubbing motion without anxiety.

In addition, the amount of friction may be one amount selected from the number of times in which the pixel area is rubbed, pressing force at friction, a friction direction, and a friction velocity, or the amount determined by a plurality of combinations. Further, the image group may be a plurality of continuously taken images while changing any parameter capable of changing when being taken. Then, the parameter may be depth of field, image effect, or a control parameter which is for controlling flash. In this regard, however, the configurations of the above image processing apparatus are not limited to these examples, but, various modifications may be made in response to a function and a configuration of an imaging device which images an image group.

ADVANTAGEOUS EFFECT

Next, the effects obtained by applying the present embodiment will be simply tied together. However, specific effects obtained by respective configurations of the present embodiment have already been described in the description thereof. Therefore, the description of the present case is one in which these specific effects are tied together. First, when the technique according to the embodiment is used, there can be obtained an effect of synthesize continuously taken images via an easy operation system becomes possible. In addition, an effect allowing images to be synthesized by changing a user's intended position, range, or degree of synthesization by a series of friction motions are possible. Further, an effect allowing the easy formation of an image which is actually difficult to take can be obtained.

It should be understood by those skilled in the art that various modifications, combinations, sub-combinations and alterations may occur depending on design and other factors insofar as they are within the scope of the appended claims or the equivalents thereof.

The present application contains subjected matter related to that disclosed in Japanese Priority Patent Application JP 2008-165605 filed in the Japan Patent Office on Jun. 25, 2008, the entire contents of which is hereby incorporated by reference.

What is claimed is:

1. An image processing apparatus comprising:
   a display screen displaying a first image included in a continuously taken image group;
   a friction position detector detecting a friction position on the display screen rubbed by a user; and
   an image synthesizing unit synthesizing a pixel area of the first image corresponding to the friction position, and a pixel area of a second image included in the image group;
   wherein the image synthesizing unit switches the second image to be synthesized with the first image so as to increase an imaging time difference between the first image and the second image along with an increase in the amount of friction rubbed by the user.

2. The image processing apparatus according to claim 1, wherein the image synthesizing unit increases a synthesization ratio of the second image to the first image along with the increase in the amount of friction, and switches the second image to an image in which imaging time difference from the first image is larger at a stage where the amount of friction exceeds a predetermined threshold.

3. The image processing apparatus according to claim 2, wherein the image synthesizing unit displays the second image before switching to the pixel area till the amount of friction exceeds the predetermined threshold by a predetermined amount, and switches the second image at a stage where the predetermined amount is exceeded.

4. The image processing apparatus according to claim 3, wherein the amount of friction is one amount selected from the number of times in which the pixel area is rubbed, pressing force at the time of friction, a direction of friction, and a friction velocity; or the amount determined by a plurality of combinations.

5. The image processing apparatus according to claim 1, wherein the image group is a plurality of continuously taken images while changing an arbitrary parameter that is modifiable at the time of imaging.

6. The image processing apparatus according to claim 5, wherein the parameter is a depth of field, an image effect, or a control parameter which is for controlling flash.

7. An image processing method comprising steps of:
   detecting a position of friction on a display screen rubbed by a user when a first image included in a continuously taken image group is displayed on the display screen; and
   synthesizing images of a pixel area of the first image corresponding to the position of friction and a pixel area of a second image included in the image group;
   wherein in the step of synthesizing images, the second image to be synthesized with the first image is switched so as to increase an imaging time difference between the first image and the second image with an increase in the amount of friction applied by the user.

* * * * *